(12) United States Patent
Ma

(10) Patent No.: US 10,871,819 B2
(45) Date of Patent: Dec. 22, 2020

(54) TIMING CONTROLLER, DISPLAY DRIVING CIRCUIT AND CONTROL METHOD AS WELL AS ELECTRONIC COMPONENT THEREOF, AND DISPLAY DEVICE

(71) Applicants: BOE Technology Group Co., Ltd., Beijing (CN); Hefei BOE Optoelectronics Technology Co., Ltd., Hefei (CN)

(72) Inventor: Tao Ma, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 108 days.

(21) Appl. No.: 16/148,114

(22) Filed: Oct. 1, 2018

(65) Prior Publication Data

US 2019/0107883 A1 Apr. 11, 2019

(30) Foreign Application Priority Data

Oct. 9, 2017 (CN) .......................... 2017 1 0929995

(51) Int. Cl.
*G06F 1/3287* (2019.01)
*G09G 3/36* (2006.01)
*G06F 1/3234* (2019.01)

(52) U.S. Cl.
CPC .......... *G06F 1/3287* (2013.01); *G06F 1/3265* (2013.01); *G09G 3/3611* (2013.01); *G09G 2310/08* (2013.01); *G09G 2330/023* (2013.01); *G09G 2330/026* (2013.01)

(58) Field of Classification Search
None
See application file for complete search history.

(56) References Cited

U.S. PATENT DOCUMENTS

2017/0039964 A1  2/2017  Shangguan

FOREIGN PATENT DOCUMENTS

| CN | 1845624 A | 10/2006 |
|---|---|---|
| CN | 204496890 U | 7/2015 |
| CN | 105792389 A | 7/2016 |
| CN | 106648025 A | 5/2017 |
| JP | 2010050703 A | 3/2010 |

OTHER PUBLICATIONS

First office action of Chinese application No. 201710929995.3 dated Aug. 5, 2019.

*Primary Examiner* — Nicholas J Lee
(74) *Attorney, Agent, or Firm* — Fay Sharpe LLP

(57) ABSTRACT

A timing controller, a display driving circuit and a control method as well as an electronic component thereof, and a display device are provided. The timing controller is for a display device including a display driving circuit, the timing controller including at least one of electronic components; wherein the timing controller includes a first transmitting circuit, configured to transmit a sleep signal to the at least one of electronic components after the end of a display scanning period in each display cycle to enable the electronic component receiving the sleep signal to enter a sleep state; and a second transmitting circuit, configured to transmit a waking-up signal to each of the electronic components in the sleep state before the start of each display cycle to wake up each of the electronic components in the sleep state.

18 Claims, 6 Drawing Sheets

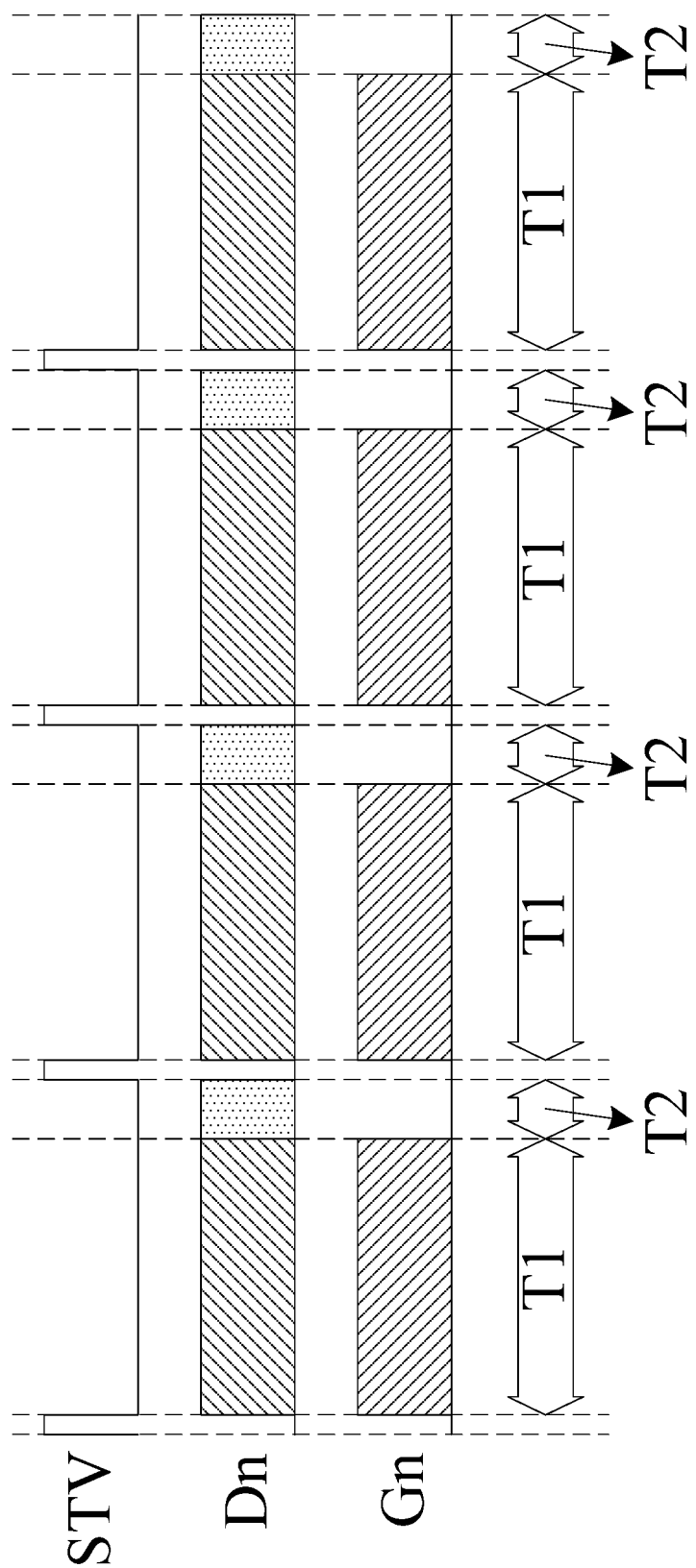

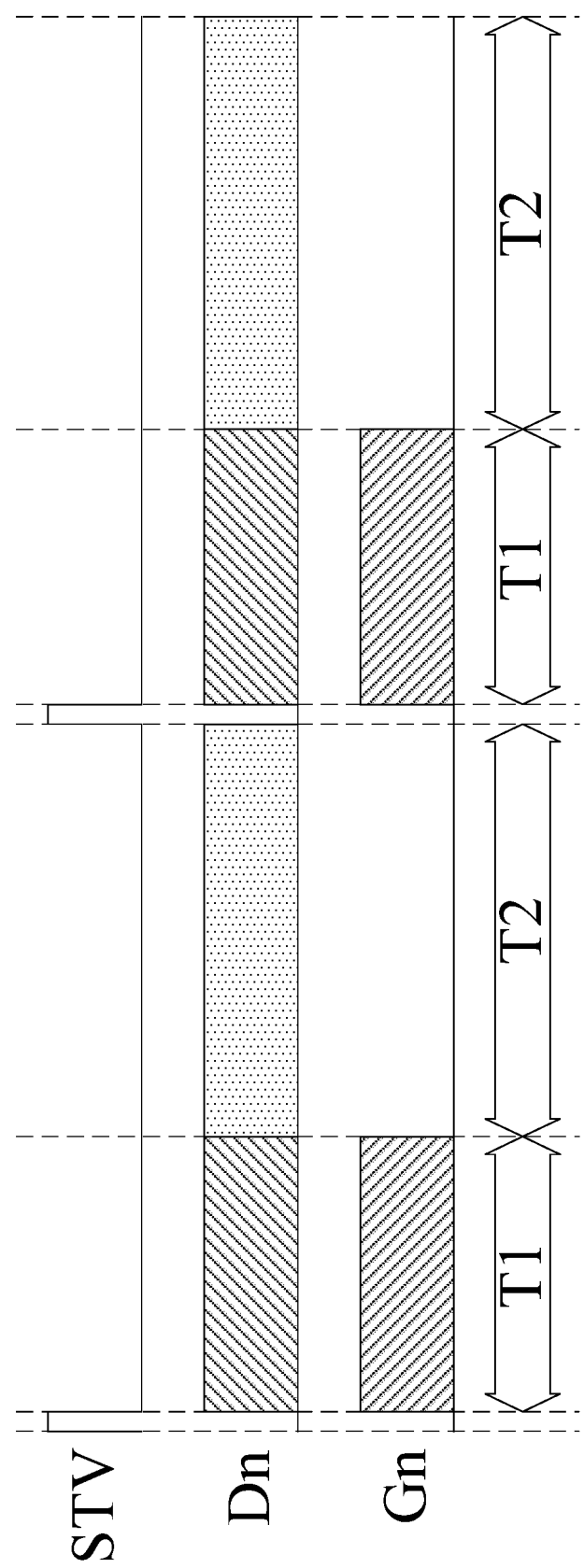

TIMING CONTROLLER, DISPLAY DRIVING CIRCUIT AND CONTROL METHOD AS WELL AS ELECTRONIC COMPONENT THEREOF, AND DISPLAY DEVICE

This application claims priority to the Chinese Patent Application No. 201710929995.3, filed on Oct. 9, 2017 and titled "TIMING CONTROLLER, DISPLAY DRIVING CIRCUIT AND CONTROL METHOD THEREOF, AND DISPLAY DEVICE", the entire contents of which are incorporated herein by reference.

TECHNICAL FIELD

The present disclosure relates to a timing controller, a display driving circuit and a control method as well as an electronic component thereof, and a display device.

BACKGROUND

Generally, portable terminal equipment such as a mobile phone, a notebook computer and a tablet computer etc. have very high usage requirement for battery power and power consumption, so that power saving is very important for each of the electronic components in the terminal equipment. Currently, the low frequency technology of a display device allows a liquid crystal display (LCD) to work at a lower frame frequency compared with the conventional 60 hertz (Hz). Thus, related power consumption can be reduced by decreasing the refresh rate.

SUMMARY

The present disclosure provides a timing controller, a display driving circuit and a control method as well as an electronic component thereof, and a display device.

In an aspect, the present disclosure provides a timing controller for a display device comprising a display driving circuit which is located outside a display area and comprises at least one of electronic components, wherein the timing controller comprises:

a first transmitting circuit, configured to transmit a sleep signal to the at least one of electronic components after the end of a display scanning period in each display cycle to enable the electronic component receiving the sleep signal to enter a sleep state; and a second transmitting circuit, configured to transmit a waking-up signal to each of the electronic components in the sleep state before the start of each display cycle to wake up each of the electronic components in the sleep state.

In a possible implementation, the second transmitting circuit comprises:

an acquisition sub-circuit, configured to acquire a waking-up time duration; and a transmitting sub-circuit, configured to transmit the waking-up signal to each of the electronic components in the sleep state at a first time in each display cycle, the first time being a time that is the waking-up time duration earlier than a start time of a next display cycle.

In a possible implementation, the timing controller is provided with a first signal terminal and a second signal terminal; the first signal terminal is connected to the first transmitting circuit, and is configured to connect each of the electronic components; the second signal terminal is configured to output an enable signal for controlling whether a source driver outputs a data voltage or not; and the first transmitting circuit comprises:

a first output sub-circuit, configured to provide an active level to the first signal terminal at each second time to enable the electronic component connected to the first signal terminal to enter the sleep state, the second time being a time at which the enable signal is transited from the active level to the inactive level.

In a possible implementation, the timing controller is provided with a first signal terminal and a third signal terminal; the first signal terminal is connected to the second transmitting circuit, and is configured to connect each of the electronic components; the third signal terminal is configured to output a frame start signal of the display driving circuit; and the second transmitting circuit comprises:

a second output sub-circuit, configured to provide an inactive level to the first signal terminal at each third time to wake up each of the electronic components connected to the first signal terminal, the third time being a time that is the waking-up time duration earlier than the time at which the frame start signal is transited from the inactive level to the active level.

In a possible implementation, each of the electronic components comprises a waking-up receiving circuit configured to wake up the corresponding electronic component from the sleep state when receiving the waking-up signal.

In a possible implementation, the at least one of electronic components is a source driver configured to implement at least one of the following functions:

turning off all components except the waking-up receiving circuit when entering the sleep state; and disabling all functions of the waking-up receiving circuit except a function of receiving the waking-up signal when entering the sleep state.

In a possible implementation, the at least one of electronic components is a power management component configured to implement at least one of the following functions:

stopping outputting a voltage that does not need to be output outside the display scanning period when entering the sleep state; and controlling all internal buck converters to be switched to a light-load power saving mode when entering the sleep state.

In another aspect, there is provided a display driving circuit in a display device, comprising: at least one of electronic components, and any one the above the timing controllers.

In a possible implementation, the at least one of electronic components comprises:

a sleep circuit, configured to receive a sleep signal transmitted after the end of a display scanning period in each display cycle, and control the corresponding electronic component to enter a sleep state in respond to the sleep signal; and a waking-up receiving circuit, configured to receive a waking-up signal transmitted before the start of each display cycle, and wake up the corresponding electronic component from the sleep state in respond to the waking-up signal.

In yet another aspect, there is provided a display device, comprising any of the above display driving circuits.

In still yet another aspect, there is provided an electronic component in a display driving circuit which is outside a display area in a display device, the electronic component comprising:

a sleep circuit, configured to receive a sleep signal transmitted after the end of a display scanning period in each display cycle, and control the electronic component to enter a sleep state in respond to the sleep signal; and a waking-up receiving circuit, configured to receive a waking-up signal transmitted before the start of each display cycle, and wake up the electronic component from the sleep state in respond to the waking-up signal.

In a possible implementation, the electronic component is a power management component configured to implement at least one of the following functions:

stopping outputting a voltage that does not need to be output outside the display scanning period when entering the sleep state; and controlling all internal buck converters to be switched to a light-load power saving mode when entering the sleep state.

In a possible implementation, the electronic component is a source driver configured to implement at least one of the following functions:

turning off all components except the waking-up receiving circuit when entering the sleep state; and disabling all functions of the waking-up receiving circuit except a function of receiving the waking-up signal when entering the sleep state.

In still yet another aspect, there is provided a control method for a display driving circuit which is outside a display area in a display device and comprises at least one of electronic components, the method comprising:

transmitting a sleep signal to the at least one of electronic components after the end of a display scanning period in each display cycle to enable the electronic component receiving the sleep signal to enter a sleep state; and transmitting a waking-up signal to each of the electronic components in the sleep state before the start of each display cycle to wake up each of the electronic components in the sleep state.

In a possible implementation, transmitting the waking-up signal to each of the electronic components in the sleep state before the start of each display cycle to wake up each of the electronic components in the sleep state comprises:

acquiring a waking-up time duration; and transmitting the waking-up signal to each of the electronic components in the sleep state at a first time in each display cycle, the first time being a time that is the waking-up time duration earlier than a start time of a next display cycle.

In a possible implementation, transmitting the sleep signal to the at least one of electronic components after the end of the display scanning period in each display cycle to enable the electronic component receiving the sleep signal to enter the sleep state comprises:

providing an active level to a first signal terminal at each second time to enable the electronic components connected to the first signal terminal to enter the sleep state, the second time being a time at which the enable signal for controlling whether a source driver outputs data is transited from the active level to the inactive level.

In a possible implementation, transmitting the waking-up signal to each of the electronic components in the sleep state before the start of each display cycle to wake up each of the electronic components in the sleep state comprises:

providing an inactive level to the first signal terminal at each third time to wake up the electronic component connected to the first signal terminal, the third time being a time that is the waking-up time duration earlier than the time at which a frame start signal is transited from the inactive level to the active level.

In a possible implementation, each of the electronic components comprises a waking-up receiving circuit, and the method further comprises waking up the corresponding electronic component from the sleep state when receiving the waking-up signal by the waking-up receiving circuit.

In a possible implementation, the at least one of electronic components is a source driver, and the method further comprises performing at least one of the following steps by the source driver:

turning off all components except the waking-up receiving circuit when entering the sleep state; and disabling all functions of the waking-up receiving circuit except a function of receiving the waking-up signal when entering the sleep state.

In a possible implementation, the at least one of electronic components is a power management component, the method further comprises performing at least one of the following steps by the power management component:

stopping outputting a voltage that does not need to be output outside the display scanning period when entering the sleep state; and controlling all internal buck converters to be switched to a light-load power saving mode when entering the sleep state.

BRIEF DESCRIPTION OF THE DRAWINGS

FIG. 3A is a schematic view of a display timing at a normal frame frequency according to an embodiment of the present disclosure;

FIG. 3B is schematic view of a display timing at a low frame frequency according to an embodiment of the present disclosure;

DETAILED DESCRIPTION

The present disclosure will be described in further detail with reference to the enclosed drawings, to clearly present the principles and advantages of the present disclosure. It is obvious that the described embodiments are part rather than all of the embodiments of the present disclosure. All other embodiments obtained by those of ordinary skill in the art based on the embodiments of the present disclosure without creative work are within the scope of protection of the present disclosure. Unless otherwise defined, technical terms or scientific terms used in the present disclosure shall be of ordinary meaning as understood by those of ordinary skill in the art to which the present disclosure pertains. The term "first" or "second" or a similar term used in the present disclosure does not denote any order, quantity, or importance, but is merely used to distinguish different components. The term "comprising" or a similar term means that elements or items which appear before the term include the elements or items listed after the term and their equivalents, and do not exclude other elements or items. The term "connection" or "connected to" or a similar term is not limited to a physical or mechanical connection but may include an electrical connection that is direct or indirect.

Figure 1:
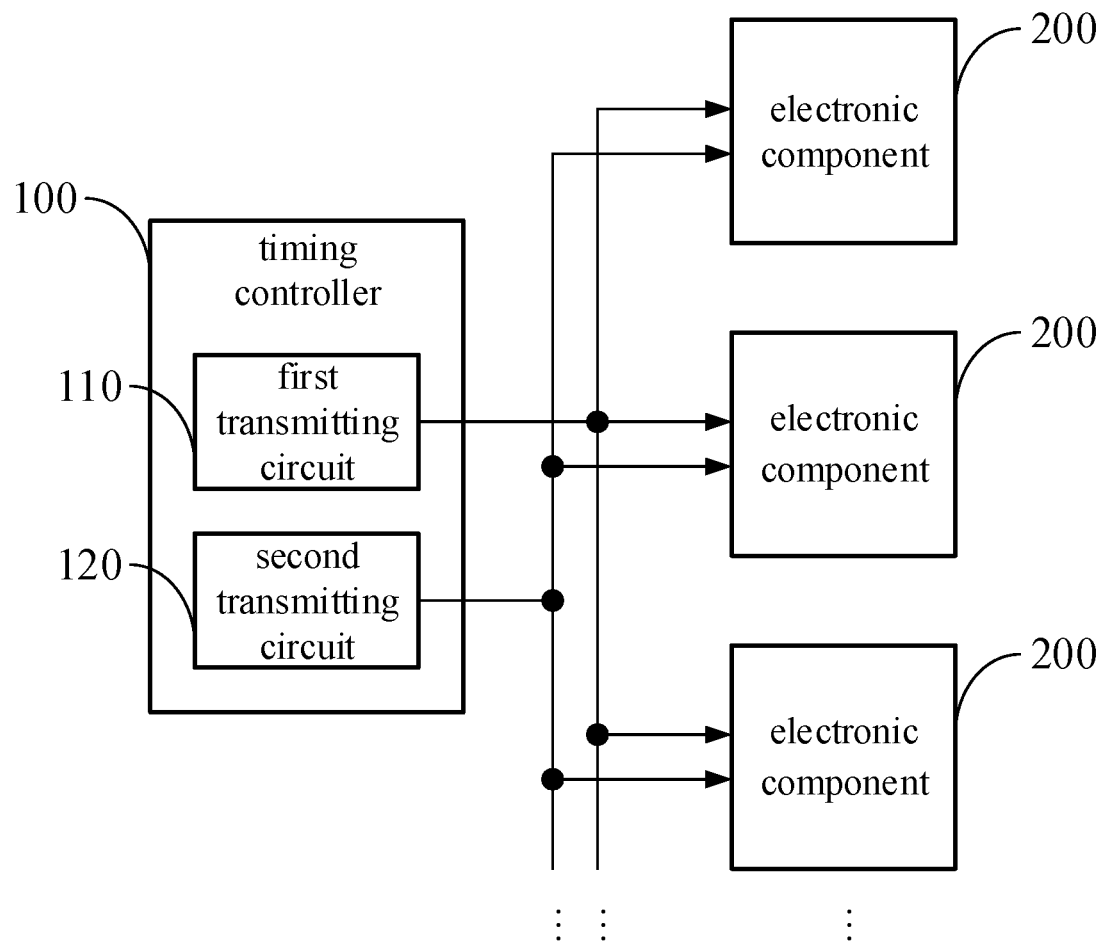
FIG. 1 is a schematic diagram of a structure of a display driving circuit according to an embodiment of the present disclosure.

FIG. 1 is a schematic diagram of a structure of a display driving circuit according to an embodiment of the present disclosure. Referring to FIG. 1, the display driving circuit includes a timing controller 100 and at least one of electronic components 200 (three electronic components 200 shown in FIG. 1 are taken as examples). The timing controller 100 includes a first transmitting circuit 110 and a second transmitting circuit 120. Herein, the first transmitting circuit 110 is configured to transmit a sleep signal to the at least one of electronic components 200 after the end of a display scanning period in each display cycle to enable the electronic component 200 receiving the sleep signal to enter a sleep state. The second transmitting circuit 120 is configured to transmit a waking-up signal to each of the electronic components 200 in the sleep state before the start of each display cycle to wake up each of the electronic components in the sleep state. It should be understood that the display driving circuit refreshes a display screen in accordance with, for example, a display cycle of a display frame when implementing a display function. In addition, a display scanning period refers to a period during which the display screen is refreshed in each display cycle actually.

It should be noted that the electronic component 200 may be any circuit structure that consumes electric energy in the display driving circuit. Each of the electronic components 200 in the display driving circuit may be any one of, for example, a source driver, a gate driver, a power management component, a gamma voltage generator and a DC-DC Converter, and may not be limited thereto. The sleep state refers to a low power consumption working state of the electronic component 200. When entering the sleep state, a manner through which the power consumption of the electronic component is reduced may include, for example, disabling some or all of the functions, stopping supplying power to part of components, reducing an output power of a signal to be output, and switching the mode of the component to a power-saving mode, and may not be limited thereto. It should be understood that in the embodiments of the present disclosure, all or part of the electronic components 200 in the display driving circuit may periodically enter the sleep state. The timing controller 100 may control different electronic components 200 to enter the sleep state in different display cycles. As the periods in which the electronic component 200 are in the sleep state in the embodiments of the present disclosure are outside a display scanning period in each display cycle, power consumption can be reduced at least by adjusting or turning off signals or components which are not required outside the display scanning periods. It should be understood that the electronic component 200 periodically entering the sleep state may affect the display performance to some extent. At this time, the working mode of each of the electronic components 200 in the sleep state can be adjusted according to an application requirement so as to balance the power consumption and the performance.

In addition, the electronic component 200 can be woken up from the sleep state through a corresponding inverse process corresponding to the process when entering the sleep state. A structure for performing the inverse process may be, for example, a component which is arranged in the electronic component 200 and which is particularly configured to receive a waking-up signal and wake up the electronic component, may also be, for example, a switch for turning on an electric energy input channel of the electronic component 200 when receiving the waking-up signal, and may also be, for example, a controller in the electronic component 200, which may not be limited thereto.

It can be seen that based on the sleep of the electronic component 200 after the end of the display scanning period to the start of the next display cycle, in the embodiment of the present disclosure, power consumed by the electronic component that does not actually contribute to the display function during this period at a low frequency scene can be saved. Meanwhile, a working state of the electronic component during the scanning period cannot be affected. Therefore, the reduction of the minimum power consumption and the average power consumption of a low-frequency display product as well as the achievement of ultra-low power consumption of a display product is facilitated.

Figure 2:
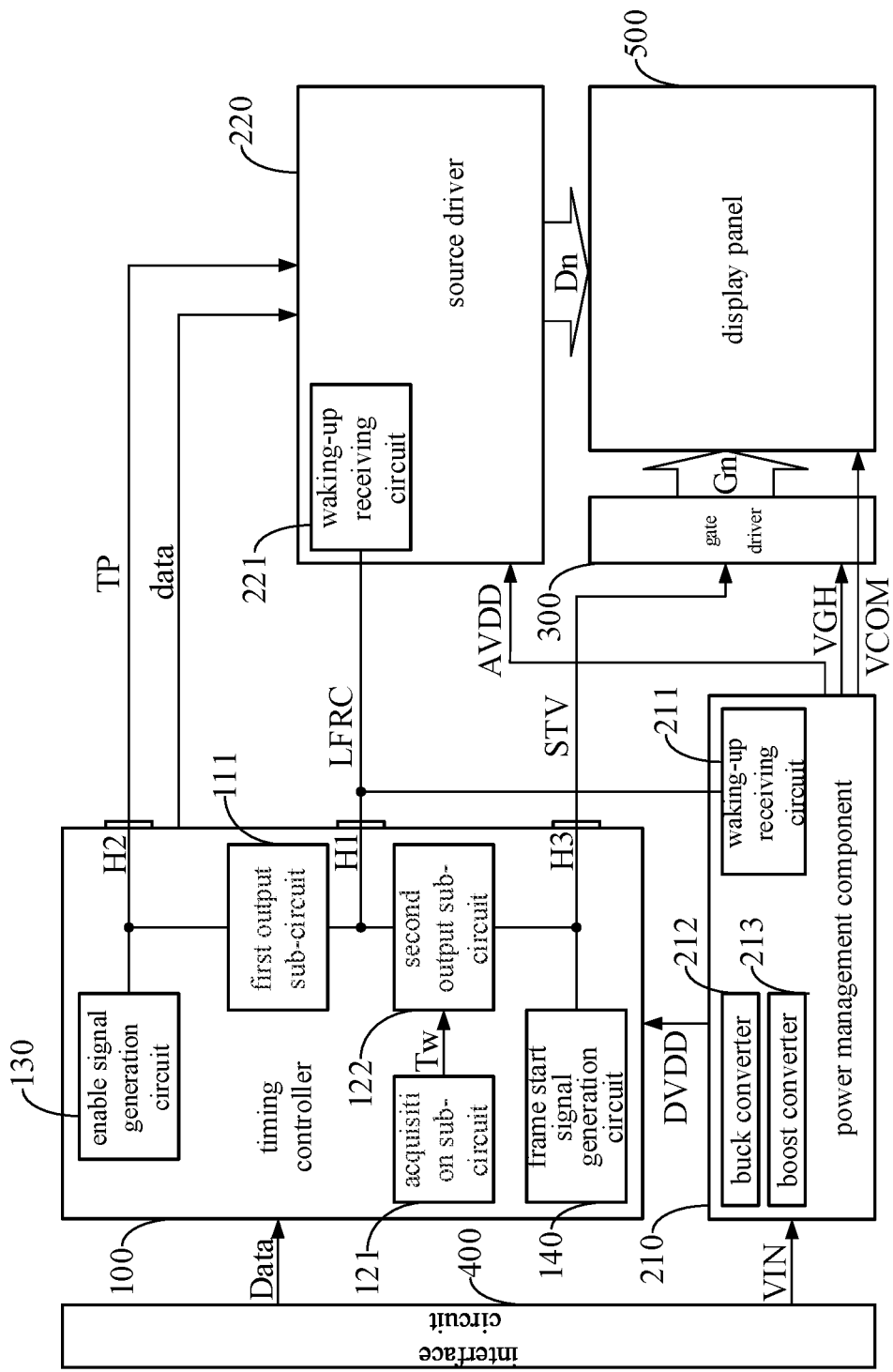
FIG. 2 is a schematic view of an application scenario of a display driving circuit according to another embodiment of the present disclosure.

FIG. 2 is a schematic view of an application scenario of a display driving circuit according to another embodiment of the present disclosure. Referring to FIG. 2, the display driving circuit of the embodiment comprises a timing controller 100, a power management component 210, a source driver 220, a gate driver 300 and an interface circuit 400. Each of the power management component 210 and the source driver 220 is one of the at least one of electronic components 200. In general, the display driving circuit receives display data "Data" and the power supply voltage VIN from the outside through the interface circuit 400, and generates a corresponding gate driving signal Gn and data voltage Dn to control the screen refresh of a display panel 500. It should be understood that the display driving circuit in an actual product may comprise more components, and each component may have more inputs and/or outputs. In addition, more circuit structures may be included inside each component, which will not be mentioned herein for the sake of clarity.

As shown in FIG. 2, the timing controller 100 of the present embodiment comprises a first output sub-circuit 111, an acquisition sub-circuit 121, a second output sub-circuit 122, an enable signal generation circuit 130, and a frame start signal generation circuit 140, wherein the first output sub-circuit 111 is included in the first transmitting circuit 110; and the acquisition sub-circuit 121 and the second output sub-circuit 122 are included in the second transmitting circuit 120.

Herein, the enable signal generation circuit 130 is a circuit structure for generating an enable signal TP (a signal for controlling whether the source driver outputs a data voltage or not) in the timing controller 100. The signal generation circuit 130 is connected to a second signal terminal H2 of the timing controller 100, and can control whether the source driver 220 outputs the data voltage Dn or not through the connection between the second signal terminal H2 and the source driver 220. It should be understood that the second signal terminal H2 of the timing controller 100 is configured to output an enable signal TP for controlling whether the source driver 220 outputs the data voltage or not. In an example, when the enable signal TP is at an active level, the source driver 220 can provide the generated data voltage to the display panel 500. When the enable signal TP is at an inactive level, a channel allowing the source driver 220 to output the data voltage Dn to the display panel 500 is temporarily interrupted. It should be noted that the active level and the inactive level herein refer to two different pre-configured voltage ranges (both based on a common terminal voltage) for a specific signal or circuit node, respectively. In an example, the active levels of all signals and circuit nodes are high levels in a circuit thereof. In yet another example, the active levels of all signals and circuit nodes are low levels in the circuit thereof.

The frame start signal generation circuit 140 is a circuit structure for generating a frame start signal STV (a signal which is used to start an operation of the gate driver during a display scanning period and can indicate the start of a display frame) in the timing controller 100. The frame start signal generation circuit 140 is connected to a third signal terminal H3 of the timing controller 100, and can start a related operation of the gate driver 300 at the beginning of the display scanning period through the connection between the third signal terminal H3 and the gate driver 300. It should be understood that the third signal terminal H3 of the timing controller 100 is used to output the frame start signal STV.

The first output sub-circuit 111 is connected to a first signal terminal H1 of the timing controller 100. The first signal terminal H1 of the timing controller 100 is used to connect each of the electronic components 200, and thus is connected to the power management component 210 and the source driver 220 in this embodiment, respectively. The first output sub-circuit 111 is configured to set the level at the first signal terminal H1 to an active level at each second time (the time when the enable signal TP is transited from the active level to the inactive level), so that the electronic component 200 connected to the first signal terminal H1 enters the sleep state. In an example, the enable signal TP is changed from a high level as an active level to a low level as an inactive level at the end of the display scanning period. Under this condition, the first output sub-circuit 111 pulls down the first signal terminal H1 to a low level as an active level, so that the electronic component 200 which is connected to the first signal terminal H1 and receives a falling edge at the first signal terminal H1 (an exemplary implementation of the sleep signal described above) starts to perform a related operation to enter the sleep state.

The second output sub-circuit 122 is also connected to the first signal terminal H1 of the timing controller 100, and the second output sub-circuit 122 is configured to set a level of the first signal terminal H1 to an inactive level at a time that is a preset time duration earlier than each time when the inactive level of the frame start signal STV is changed to the active level, so as to wake up the electronic component 200 connected to the first signal terminal H1 from the sleep state. In this embodiment, the preset time duration is exemplarily acquired by the acquisition sub-circuit 121, is particularly a configuration parameter stored in a memory inside the timing controller 100, and is recorded as a waking-up time duration Tw. In an example, the acquisition sub-circuit 121 reads the data of the waking-up time duration Tw from the memory when being powered-on, so as to act on the connected second output sub-circuit 122 to complete the configuration of the preset time duration. Thus, the second output sub-circuit 122 takes the frame start signal STV as a reference in each display cycle, and pulls up the first signal terminal H1 to a high level as an inactive level at each third time (a time that is the waking-up time duration earlier than the time when each of the frame start signals STV is changed from the inactive level to the active level), so that the electronic component 200 which is connected to the first signal terminal H1 and receives a rising edge at the first signal terminal H1 (an exemplary implementation of the above waking-up signal) starts to perform a related operation to wake itself up from the sleep state. It should be understood that when the second transmitting circuit 120 needs a transmitting sub-circuit for transmitting the waking-up signal to each of the electronic components at each of the first time (a time that is the waking-up time duration earlier than a start time of each display cycle), the second output sub-circuit 122 in the above example may be used simultaneously as the transmitting sub-circuit.

As shown in FIG. 2, the power management component 210 comprises a waking-up receiving circuit 211, at least one buck converter 212 (only one is shown in FIG. 2 as an example), and at least one boost converter (only one is shown in FIG. 2 as an example). The waking-up receiving circuit 211 is connected to the first signal terminal H1. In this embodiment, the waking-up receiving circuit 211 is configured to not only receive a waking-up signal, and wake up, when receiving the waking-up signal, the corresponding electronic component 200, the power management component 210 from the sleep state in respond to the waking-up signal, but also receive a sleep signal and control, when receiving the sleep signal, the corresponding electronic component 200, the power management component 210 to enter the sleep state in respond to the sleep signal. It should be understood that the power management component 210 can utilize the power supply voltage VIN to obtain a voltage (and/or signal) required by other components of the display driving circuit through the internal buck converter 212 and boost converter 213. For example, the power management component 210 can utilize a boost converter to supply the gate driver 300 with a gate high voltage VGH required to turn on a thin film transistor, and can utilize a buck converter to obtain a common voltage VCOM required by a common electrode of the display panel 500. Similarly, the power management component 210 can also generate an analog high voltage AVDD and digital high voltage DVDD which are supplied to the timing controller 100 and the source driver 220, respectively. When the waking-up receiving circuit 211 controls the power management component 210 to enter a sleep state, the waking-up receiving circuit 211 can, for example, turn off the related boost converter to stop outputting voltages such as the analog high voltage AVDD, a gate high voltage VGH and a gamma voltage which only act within the display scanning period, and can maintain voltages such as a gate low voltage and a common voltage VCOM which also act outside the display scanning period. In addition, the output power of circuit components which are not turned off can be adjusted, such as reducing output current of a Buck circuit (a buck converter) and a low dropout regulator (LDO, another buck converter) so that they can work in a state with a smaller output power (a light-load power saving mode), or controlling all other buck converters to switch to a light-load power saving mode, which is beneficial to power saving. During the duration of the sleep state, the waking-up receiving circuit 211 can work in a low power consumption state for waiting for a waking-up signal to perform a reverse operation with respect to an operation for entering the sleep state when receiving the waking-up signal, so that the power management component 210 ends the sleep state.

As shown in FIG. 2, the source driver 220 comprises a waking-up receiving circuit 221. In this embodiment, the waking-up receiving circuit 221 is configured to not only receive the waking-up signal and wake up the corresponding electronic component 200, the source driver 220 from the sleep state in respond to the waking-up signal when receiving the waking-up signal, but also receive the sleep signal and control the corresponding electronic component 200, source driver 220 to enter a sleep state in respond to the sleep signal when receiving the sleep signal. It should be understood that the timing controller 100 can obtain the display data "Data" of a picture to be displayed through the interface circuit 400, and can transmit the data to the source driver 220 according to a corresponding timing, so that the source driver 220 can generate data voltage Dn provided to the display panel 500 based on this data. When the waking-up receiving circuit 221 controls the source driver 220 to enter a sleep state, the source driver 220 can turn off all components except the waking-up receiving circuit 221, such as a line buffer, a level shifter, a gamma buffer, a D/A Converter, an output buffer and an output multiplexer etc. Since the above components hardly play any role outside the display scanning period, the turning off of these components may have no significant impact on the display function. Moreover, when entering the sleep state, the waking-up receiving circuit 221 can also disable all of its functions except the function of receiving the waking-up signal, such as the function of receiving the sleep signal and the function of waiting for receiving other control commands, so that the waking-up receiving circuit 221 can work in a low power consumption state for waiting for a waking-up signal so as to turn on all components of the source driver 220 when receiving the waking-up signal, thereby enabling the source driver 220 to end the sleep state.

It should be understood that the sleep signal and the waking-up signal in this embodiment are both output by the first signal terminal H1. In an example, the signal output by the first signal terminal H1 can be referred to as a low frame rate control (LFRC) signal. The sleep signal and the waking-up signal may be any one of a rising edge and a falling edge of the LFRC signal, respectively.

FIG. 3A is a schematic view of a display timing at a normal frame frequency (60 Hz) according to an embodiment of the present disclosure. FIG. 3B is a schematic view of a display timing at a low frame frequency (30 Hz) according to an embodiment of the present disclosure. As described above, the frame start signal STV can indicate the start of a display frame, and thus the period between two adjacent rising edges of the frame start signal STV can be regarded as one display frame. By comparing FIG. 3A with FIG. 3B, it can be known that since the display frame length (1/30 second) at 30 Hz is twice the frame length (1/60 second) at 60 Hz, FIG. 3A shows 4 display frames and FIG. 3B shows only 2 display frames in the same time duration.

Referring to FIGS. 3A and 3B, in the display scanning period T1 of each display frame, the above gate driving signal Gn may be, for example, a process of outputting row by row a gate high voltage VGH of a short period of time for each pixel row (which is schematically shown by the shadow of the left oblique line). The above data voltage Dn may be, for example, a process of outputting a data voltage corresponding to each pixel in parallel in a period in which each pixel row receives the gate high voltage VGH (which is schematically shown by the shadow of the right oblique line). Therefore, the refresh of an entire screen of the corresponding display frame can be completed within the display scanning period T1. After the end of the display scanning period T1 of each display frame and before the start of the next display frame, the gate driving signal Gn maintains at the gate low voltage (schematically shown by the low level) on each pixel row; and the data voltage Dn is a random floating voltage or maintains at the neutral level (schematically shown by a dotted shadow). That is, no operation is performed on the display panel 500. For the convenience of description, the time duration is recorded as a blanking period T2.

It can be seen from FIG. 3A and FIG. 3B that when the time duration of the display scanning period T1 maintains unchanged, the proportion of the blanking period T2 in the display frame at a low frame frequency (30 Hz) is much higher than that of the blanking period T2 in the display frame at a normal frame frequency (60 Hz). In an example, at the normal frame frequency (60 Hz), the time duration of one display frame is about 16.66 ms, in which the scanning period T1 is about 14.5 ms, and the blanking period T2 is about 2.1 ms. In this scenario, the blanking period T2 is very short compared to the display scanning period T1. At the low frame frequency (30 Hz), the time duration of one display frame is about 33.33 ms, and the display scanning period T1 is still about 14.5 ms, and the blanking period T2 is about 18.83 ms. In this scenario, the blanking period T2 in each display frame is longer than the display scanning period T1.

Figure 4:
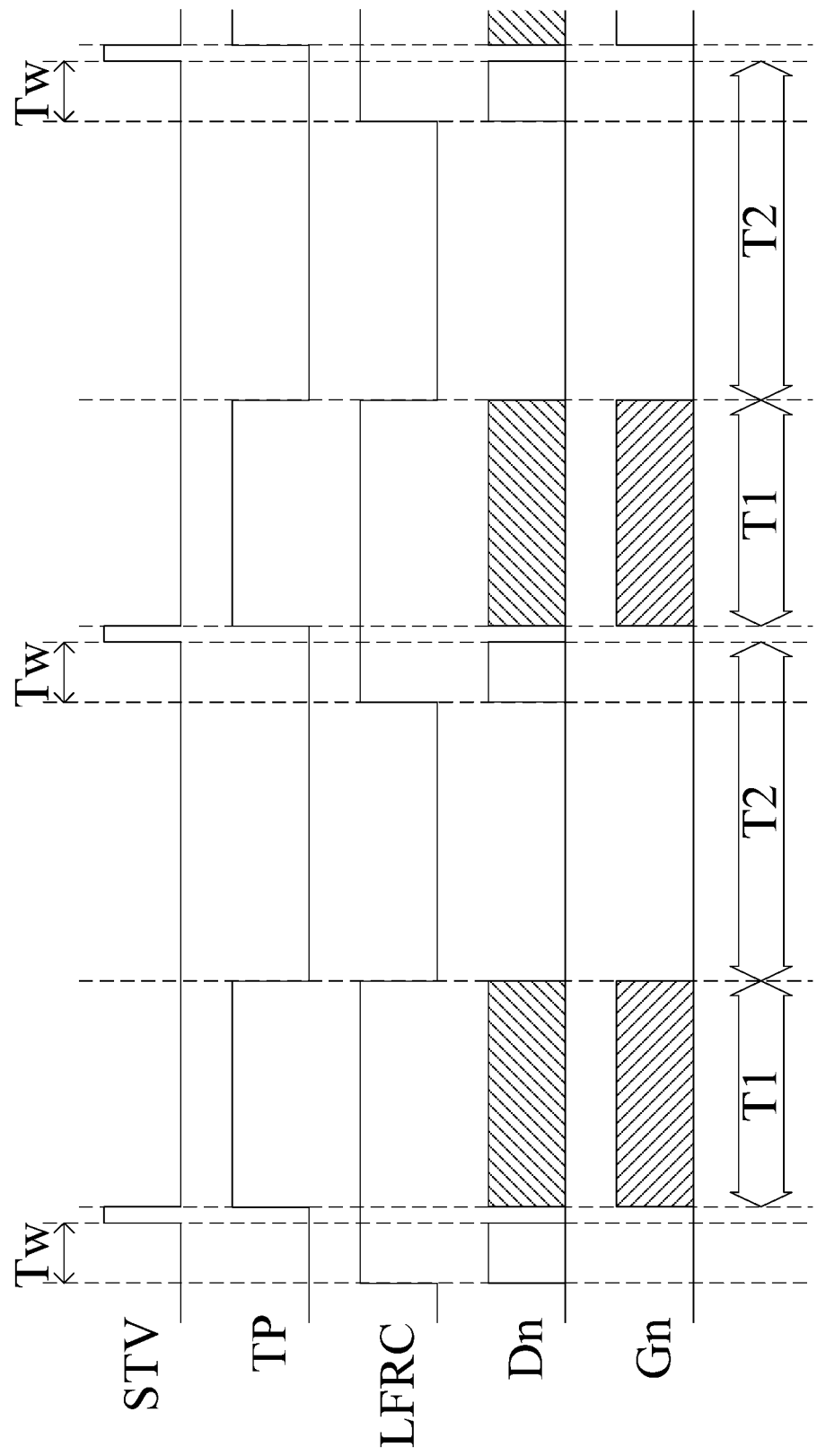
FIG. 4 is a schematic view of a display timing of a display driving circuit according to an embodiment of the present disclosure.

For the application scenario of the low frame frequency, FIG. 4 is a schematic view of a display timing of a display driving circuit provided by an embodiment of the present disclosure. As shown in FIG. 4, when the display driving circuit shown in FIG. 2 is used for display driving at a low frame frequency, the above enable signal TP maintains at a high level as an active level in the display scanning period T1, while at the end of the display scanning period T1, the high level as the active level is changed to a low level as an inactive level. Thus, the first output sub-circuit 111 shown in FIG. 2 can trigger an operation of setting the level of the low-frequency control signal LFRC to a low level as an active level, so that the waking-up receiving circuits 211 and 221 which receive the falling edge will execute respectively related operations to enable the power management component 210 and the source driver 220 to enter a sleep state. Under the action of the second output sub-circuit 122 shown in FIG. 2, the frame enable signal STV is taken as a reference. At each third time (a time that is the above waking-up time duration earlier than a rising edge of the frame enable signal STV), an operation is performed to set the level of the low-frequency control signal LFRC to a high level as an inactive level, so that the waking-up receiving circuits 211 and 221 which receive the rising edge will execute respectively related operations to wake up the power management component 210 and the source driver 220 from the sleep state. Thus, the power management component 210 and the source driver 220 can work in a relatively low power consumption state during the sleep state, so that the total power consumption of the display driving circuit in each blanking period T2 is reduced, thereby reducing the lowest power consumption and the average power consumption of a low-frequency display product.

As an example of the effect, power consumptions of a display driving circuit of a 15.6-inch ultra-high definition (UHD) display device manufactured by an oxide semiconductor process are 1500 mW and 1400 mW, respectively at 60 Hz and 30 Hz. After adopting an implementation shown in FIGS. 2 and 4, the power consumption of the circuit at 30 Hz is reduced to 1100 mW, which is 300 mW lower than before.

It should be noted that the setting of the waking-up time duration Tw is used to reserve time for a start process of the source driver 220. That is, an internal component of the source driver 220 needs a period of time from the off state to the normal working state, and the operations to be executed in the display scanning period T1 may not be normally executed during this time duration. Therefore, the waking-up time duration Tw can be pre-configured corresponding to this period of time, so that the source driver 220 completes its own waking-up process before the start of each display frame (the output voltage Dn may fluctuate during this period, and is represented as a blanking square in FIG. 4) to avoid abnormal conditions. Of course, depending on the different selected electronic components, the waking-up time duration Tw can be set, for example, with reference to the maximum value of a required time duration of the waking-up process, so as to ensure the normal operation of the respective electronic components, which is not limited thereto.

Based on the same inventive concept, the embodiments of the present disclosure further provide a display device, comprising any of the above timing controllers, any of the electronic components, and/or any of the display driving circuits. The display device may be any other products or components having a display function, such as a mobile phone, a tablet computer, a TV, a display, a notebook computer, a digital photo frame, a navigator and so on. The display device can achieve the same or corresponding beneficial effects based on the beneficial effects that can be achieved by the structure included in the device.

Figure 5:
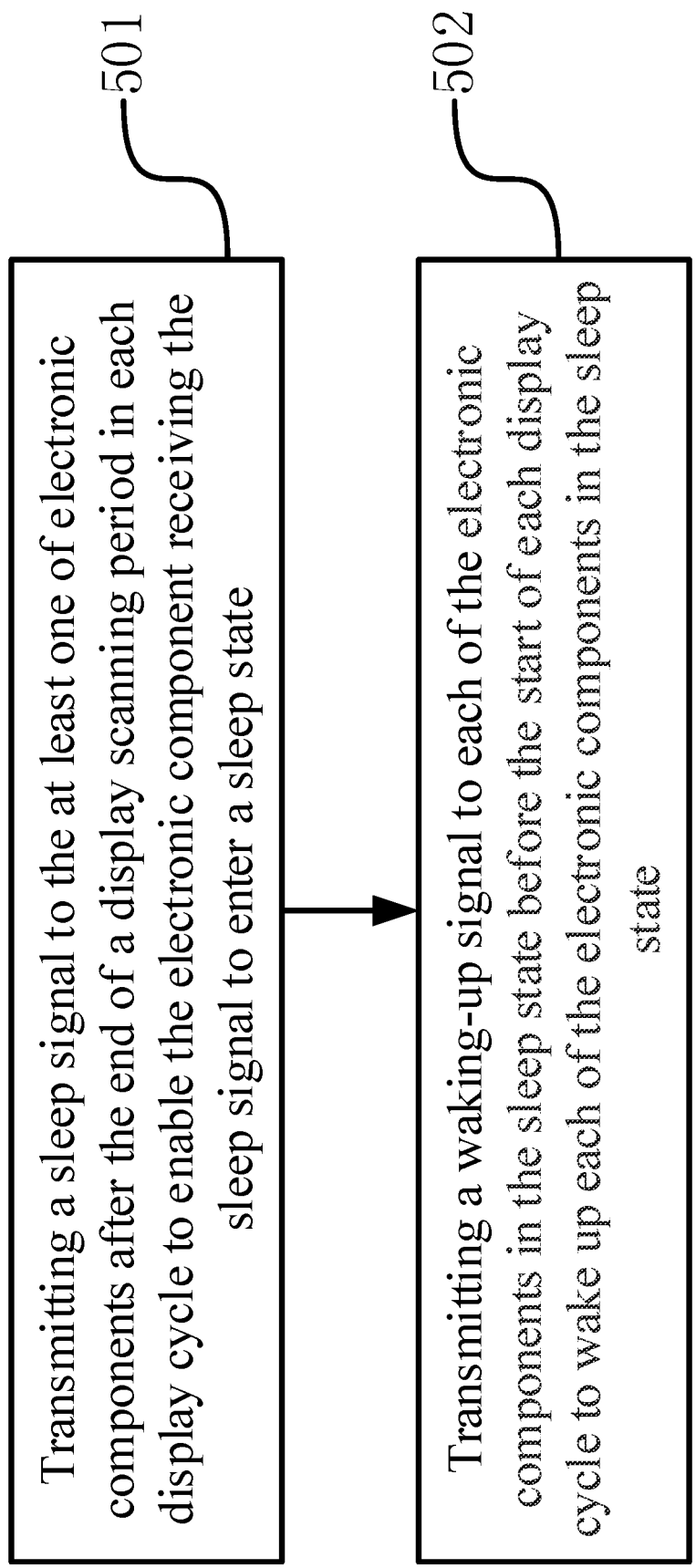
FIG. 5 is a flowchart of a control method for a display driving circuit according to an embodiment of the present disclosure.

FIG. 5 is a flowchart of a control method for a display driving circuit according to an embodiment of the present disclosure. The display driving circuit is a circuit located outside the display area in the display device. The display driving circuit include at least one of electronic components. Referring to FIG. 5, the control method includes the following steps.

In step 501, a sleep signal is transmitted to the at least one of electronic components after the end of a display scanning period in each display cycle to enable the electronic component receiving the sleep signal to enter a sleep state.

In step 502, a waking-up signal is transmitted to each of the electronic components in the sleep state before the start of each display cycle to wake up each of the electronic components in the sleep state.

In a possible implementation, transmitting the waking-up signal to each of the electronic components in the sleep state before the start of each display cycle to wake up each of the electronic components in the sleep state includes:

acquiring a waking-up time duration; and transmitting the waking-up signal to each of the electronic components in the sleep state at a first time in each display cycle, the first time being a time that is the waking-up time duration earlier than a start time of a next display cycle.

In a possible implementation, transmitting the sleep signal to the at least one of electronic components after the end of the display scanning period in each display cycle to enable the electronic component receiving the sleep signal to enter the sleep state includes:

providing an active level to a first signal terminal at each second time to enable the electronic component connected to the first signal terminal to enter the sleep state, the second time being a time at which the enable signal for controlling Whether a source driver outputs data or not is transited from an active level to the inactive level.

In a possible implementation, transmitting, the waking-up signal to each of the electronic components in the sleep state before the start of each display cycle to wake up each of the electronic components in the sleep state includes:

providing an inactive level to the first signal terminal at each third time to wake up the electronic component connected to the first signal terminal, the third time being a time that is the waking-up time duration earlier than the time at which a frame start signal is transited form the inactive level to the active level.

In a possible implementation, each of the electronic components comprises a waking-up receiving circuit configured to wake up the corresponding electronic component from the sleep state when receiving the waking-up signal.

In a possible implementation, the at least one of electronic components is a source driver configured to implement at least one of the following functions:

turning off all components except the waking-up receiving circuit when entering the sleep state; and disabling all functions of the waking-up receiving circuit except a function of receiving the waking-up signal when entering the sleep state.

In a possible implementation, the at least one of electronic components is a power management component configured to implement at least one of the following functions:

stopping outputting a voltage that does not need to be output outside the display scanning period when entering the sleep state; and controlling all internal buck converters to be switched to a light-load power saving mode when entering the sleep state.

It should be noted that, depending on different application environments, an execution body of the control method of the embodiment may be, for example, a data driver, a timing controller (TCON), a logic operation circuit for implementing at least part of the operation process, a processor arranged in the display device, and another processor arranged in external equipment and connected to the display device, and may not be limited thereto. The display device may be, for example, a display panel, a mobile phone, a tablet computer, a TV, a display, a notebook computer, a digital photo frame, a navigator, or any other product or component having a display function. The processor may be, for example, an application-specific integration circuit (ASIC), a digital signal processor (DSP), a digital signal processing device (DSPD), a programmable logic device (PLD), a field programmable gate array (FPGA), a central processing unit (CPU), a controller, a microcontroller and a microprocessor, and may not be limited thereto. When the execution body of the control method of the embodiment comprises the processor, a readable storage medium storing programs may be auxiliary provided, so that the control method of the embodiment can be implemented when the program is executed by the processor.

It should be understood that the operating process of any of the above display driving circuits may be regarded as an example of the implementation of the above control method. Therefore, the specific process examples of the above steps may be referred to the foregoing, and details thereof will not be described repeatedly herein.

It can be seen that based on the sleep of the electronic component after the end of the display scanning period to the start of the next display cycle, in the embodiment of the present disclosure, power consumed by the electronic component that does not actually contribute to the display function during this period at a low frequency scene can be saved. Meanwhile, an operating state of the electronic component during the scanning period cannot be affected. Therefore, the reduction of the minimum power consumption and the average power consumption of a low-frequency display product as well as the achievement of ultra-low power consumption of a display product is facilitated.

The foregoing descriptions are only exemplary embodiments of the present disclosure, and are not intended to limit the present disclosure. Any modifications, equivalent substitutions, improvements, etc. within the spirit and principles of the disclosure, are all included in the protection scope of the appended claims of the present disclosure.

What is claimed is:

1. A timing controller for a display device comprising a display driving circuit which is outside a display area and comprises one or more electronic components, wherein the timing controller comprises:

a first transmitting circuit, configured to transmit a sleep signal to the electronic components after the end of a display scanning period in each display cycle to enable the electronic components receiving the sleep signal to enter a sleep state; and a second transmitting circuit, configured to transmit a waking-up signal to each of the electronic components in the sleep state before the start of each display cycle to wake up each of the electronic components in the sleep state;

wherein the second transmitting circuit comprises:

an acquisition sub-circuit, configured to acquire a waking-up time duration; and a transmitting sub-circuit, configured to transmit the waking-up signal to each of the electronic components in the sleep state at a first time in each display cycle, the first time being a time that is the waking-up time duration earlier than a start time of a next display cycle.

2. The timing controller of claim 1, wherein the timing controller has a first signal terminal and a second signal terminal; the first signal terminal is connected to the first transmitting circuit, and is configured to connect each of the electronic components; the second signal terminal is configured to output an enable signal for controlling whether a source driver outputs a data voltage; and the first transmitting circuit comprises:

a first output sub-circuit, configured to provide an active level to the first signal terminal at each second time to enable the electronic components connected to the first signal terminal to enter the sleep state, the second time being a time at which the enable signal is transited from the active level to the inactive level.

3. The timing controller of claim 1, wherein the timing controller has a first signal terminal and a third signal terminal; the first signal terminal is connected to the second transmitting circuit, and is configured to connect each of the electronic components; the third signal terminal is configured to output a frame start signal of the display driving circuit; and the second transmitting circuit comprises:

a second output sub-circuit, configured to provide an inactive level to the first signal terminal at each third time to wake up each of the electronic components connected to the first signal terminal, the third time being a time that is the waking-up time duration earlier than the time at which the frame start signal is transited from the inactive level to the active level.

4. The timing controller of claim 1, wherein each of the electronic components comprises a waking-up receiving circuit configured to wake up the corresponding electronic components from the sleep state when receiving the waking-up signal.

5. The timing controller of claim 4, wherein at least one of the electronic components is a source driver configured to implement at least one of the following functions:

turning off all components except the waking-up receiving circuit when entering the sleep state; and disabling all functions of the waking-up receiving circuit except a function of receiving the waking-up signal when entering the sleep state.

6. The timing controller of claim 4, wherein at least one of the electronic components is a power management component configured to implement at least one of the following functions:

stopping output of a voltage that does not need to be output outside the display scanning period when entering the sleep state; and controlling all internal buck converters to be switched to a light-load power saving mode when entering the sleep state.

7. A display driving circuit in a display device, comprising: one or more electronic components, and the timing controller of claim 1.

8. The display driving circuit of claim 7, wherein the electronic components comprises:

a sleep circuit, configured to receive a sleep signal transmitted after the end of a display scanning period in each display cycle, and control the corresponding electronic component to enter a sleep state in response to the sleep signal; and a waking-up receiving circuit; configured to receive a waking-up signal transmitted before the start of each display cycle, and wake up the corresponding electronic component from the sleep state in response to the waking-up signal.

9. A display device, comprising the display driving circuit of claim 7.

10. An electronic component in a display driving circuit which is outside a display area in a display device, the electronic component comprising:

a sleep circuit, configured to receive a sleep signal transmitted after the end of a display scanning period in each display cycle, and control the electronic component to enter a sleep state in response to the sleep signal; and a waking-up receiving circuit, configured to receive a waking-up signal transmitted before the start of each display cycle, and wake up the electronic component from the sleep state in response to the waking-up signal.

11. The electronic component of claim 10, wherein the electronic component is a power management component configured to implement at least one of the following functions:

stopping output of a voltage that does not need to be output outside the display scanning period when entering the sleep state; and controlling all internal buck converters to be switched to a light-load power saving mode when entering the sleep state.

12. The electronic component of claim 10, wherein the electronic component is a source driver configured to implement at least one of the following functions:

turning off all components except the waking-up receiving circuit when entering the sleep state; and disabling all functions of the waking-up receiving circuit except a function of receiving the waking-up signal when entering the sleep state.

13. A control method for a display driving circuit which is outside a display area in a display device and comprises one of one or more electronic components, the method comprising:

transmitting a sleep signal to the electronic components after the end of a display scanning period in each display cycle to enable the electronic component receiving the sleep signal to enter a sleep state; and transmitting a waking-up signal to each of the electronic components in the sleep state before the start of each display cycle to wake up each of the electronic components in the sleep state;

wherein transmitting the waking-up signal to each of the electronic components in the sleep state before the start of each display cycle to wake up each of the electronic components in the sleep state comprises:

acquiring a waking-up time duration; and transmitting the waking-up signal to each of the electronic components in the sleep state at a first time in each display cycle the first time being a time that is the waking-up time duration earlier than a start time of a next display cycle.

14. The method of claim 13, wherein transmitting the sleep signal to the electronic components after the end of the display scanning period in each display cycle to enable the electronic component receiving the sleep signal to enter the sleep state comprises:
   providing an active level to a first signal terminal at each second time to enable the electronic components connected to the first signal terminal to enter the sleep state, the second time being a time at which the enable signal for controlling whether a source driver outputs data is transited from the active level to the inactive level.

15. The control method of claim 13, wherein transmitting the waking-up signal to each of the electronic components in the sleep state before the start of each display cycle to wake up each of the electronic components in the sleep state comprises:
   providing an inactive level to the first signal terminal at each third time to wake up the electronic components connected to the first signal terminal, the third time being a time that is the waking-up time duration earlier than the time at which a frame start signal is transited from the inactive level to the active level.

16. The control method of claim 13, wherein each of the electronic components comprises a waking-up receiving circuit, and the method further comprises: waking up the corresponding electronic component from the sleep state when receiving the waking-up signal by the waking-up receiving circuit.

17. The control method of claim 16, wherein at least one of the electronic components is a source driver, and the method further comprises performing at least one of the following steps by the source driver:
   turning off all components except the waking-up receiving circuit when entering the sleep state; and
   disabling all functions of the waking-up receiving circuit except a function of receiving the waking-up signal when entering the sleep state.

18. The control method of claim 16, wherein at least one of the electronic components is a power management component, the method further comprises performing at least one of the following steps by the power management component:
   stopping output of a voltage that does not need to be output outside the display scanning period when entering the sleep state; and
   controlling all internal buck converters to be switched to a light-load power saving mode when entering the sleep state.

* * * * *